US011401405B2

(12) United States Patent
Kamplain et al.

(10) Patent No.: US 11,401,405 B2
(45) Date of Patent: *Aug. 2, 2022

(54) METHODS FOR IMPROVING COLOR STABILITY IN POLYETHYLENE RESINS (71) Applicant: Chevron Phillips Chemical Company LP, The Woodlands, TX (US)

(72) Inventors: Justin Wade Kamplain, Bartlesville, OK (US); Elizabeth Mary Lanier, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/830,408

(22) Filed: Mar. 26, 2020

(65) Prior Publication Data

US 2020/0224014 A1 Jul. 16, 2020

Related U.S. Application Data (63) Continuation of application No. 15/985,797, filed on May 22, 2018, now Pat. No. 10,703,886.

(Continued)

(51) Int. Cl.
*C08L 23/08* (2006.01)
*C08K 5/134* (2006.01)
(Continued)

(52) U.S. Cl.
CPC ......... *C08L 23/0815* (2013.01); *B01J 21/063* (2013.01); *B01J 23/26* (2013.01); *C08K 3/08* (2013.01); *C08K 3/32* (2013.01); *C08K 5/098* (2013.01); *C08K 5/13* (2013.01); *C08K 5/1345* (2013.01); *C08K 5/526* (2013.01); *C08F 210/16* (2013.01); *C08F 2500/01* (2013.01); *C08F 2500/04* (2013.01); *C08F 2500/12* (2013.01);
(Continued)

(58) Field of Classification Search
CPC . C08K 5/098; C08K 5/13; C08K 5/51; C08K 5/526; C08L 23/00
See application file for complete search history.

(56) References Cited

U.S. PATENT DOCUMENTS 3,069,369 A 12/1962 Galbraith et al.
3,248,179 A 4/1966 Norwood
(Continued)

FOREIGN PATENT DOCUMENTS

CN 102942725 B 9/2015
EP 0781803 A1 7/1997
(Continued)

OTHER PUBLICATIONS

RU Search Report issued in corresponding application No. 2019134931, dated Jun. 28, 2021, 3 pages.
(Continued)

Primary Examiner — Brieann R Johnston
(74) Attorney, Agent, or Firm — Merchant & Gould P.C.

(57) ABSTRACT

Polymer compositions containing a titanated chromium-based ethylene polymer, 150-350 ppm of zinc stearate and/or calcium stearate, 50-5000 ppm of a phenolic antioxidant, 200-3000 ppm of a diphosphite antioxidant, and optionally, 200-3000 ppm of a monophosphite antioxidant, are described. These polymer compositions have improved long-term color stability, as well as lower levels of color formation after aging.

22 Claims, 5 Drawing Sheets

Related U.S. Application Data (60) Provisional application No. 62/510,787, filed on May 25, 2017.

(51) Int. Cl.

| | | |
|---|---|---|
| *C08K 5/526* | (2006.01) | |
| *B01J 21/06* | (2006.01) | |
| *B01J 23/26* | (2006.01) | |
| *C08K 3/08* | (2006.01) | |
| *C08K 3/32* | (2006.01) | |
| *C08K 5/098* | (2006.01) | |
| *C08K 5/13* | (2006.01) | |
| *C08F 210/16* | (2006.01) | |

(52) U.S. Cl.
CPC ..... *C08L 2201/08* (2013.01); *C08L 2207/062* (2013.01); *C08L 2207/066* (2013.01); *C08L 2314/04* (2013.01)

(56) References Cited

U.S. PATENT DOCUMENTS

| | | |
|---|---|---|
| 3,337,495 A | 8/1967 | Corbett et al. |
| 4,501,885 A | 2/1985 | Sherk et al. |
| 4,504,615 A | 3/1985 | Mills |
| 4,588,790 A | 5/1986 | Jenkins, III et al. |
| 5,352,749 A | 10/1994 | DeChellis et al. |
| 5,364,895 A | 11/1994 | Stevenson et al. |
| 5,436,304 A | 7/1995 | Griffin et al. |
| 5,438,086 A | 8/1995 | Stevenson et al. |
| 5,565,175 A | 10/1996 | Hottovy et al. |
| 5,575,979 A | 11/1996 | Hanson |
| 6,239,235 B1 | 5/2001 | Hottovy et al. |
| 6,262,191 B1 | 7/2001 | Hottovy et al. |
| 6,613,823 B1 | 9/2003 | Battiste et al. |
| 6,649,698 B1 | 11/2003 | Mehta |
| 6,833,415 B2 | 12/2004 | Kendrick et al. |
| 6,846,859 B2 | 1/2005 | Coffy et al. |
| 6,846,863 B2 | 1/2005 | Plume |
| 7,157,511 B2 | 1/2007 | Bobsein et al. |
| 7,531,606 B2 | 5/2009 | Hendrickson |
| 7,598,327 B2 | 10/2009 | Shaw |
| 8,048,946 B2 | 11/2011 | Hill |
| 8,067,490 B2 | 11/2011 | Zahalka et al. |
| 8,309,635 B2 | 11/2012 | Gelbin |
| 8,735,628 B2 | 5/2014 | Hill |
| 8,822,608 B1 | 9/2014 | Bhandarkar et al. |
| 8,962,116 B2 | 2/2015 | Bäckman et al. |
| 9,587,055 B2 | 3/2017 | Chai et al. |
| 2006/0047029 A1 | 3/2006 | Poloso et al. |
| 2009/0186987 A1 | 7/2009 | Dongiovanni |
| 2010/0081741 A1 | 4/2010 | Keck-Antoine et al. |
| 2011/0008559 A1 | 1/2011 | Ruemer |
| 2015/0090671 A1 | 4/2015 | Hjertberg et al. |
| 2016/0145360 A1 | 5/2016 | Hamed et al. |

FOREIGN PATENT DOCUMENTS

| | | |
|---|---|---|
| EP | 0781805 A1 | 7/1997 |
| RU | 2267504 C2 | 1/2006 |
| RU | 2450033 C1 | 5/2012 |
| RU | 2541543 C2 | 2/2015 |
| RU | 2563457 C2 | 9/2015 |
| WO | 1996038499 A1 | 12/1996 |
| WO | 1998025998 A1 | 6/1998 |
| WO | 2011014351 A1 | 2/2011 |

OTHER PUBLICATIONS

Aitor Parrondo, et al., "Additive Interactions in the Stabilization of Film Grade High-Density Polyethylene. Part I: Stabilization and Influence of Zinc Stearate During Melt Processing," Journal of Vinyl & Additive Technology, Jun. 2002, vol. 8, No. 2, pp. 75-89.
Dr. Michael P. Davies, et al., "Phosphite Process Stabilizers and the New EU Food Regulations," Dover Chemical Corporation, 15 pages.
Doverphos® S-9228 & Doverphos® S-9411, High Performance Phosphate Stabilizers, Dover Chemical Corporation, Jun. 10, 2011, 8 pages.
Aitor Parrondo, et al., "Additive Interactions in the Stabilization of Film Grade High-Density Polyethylene. Part II Stabilization During Long-Term Service," Journal of Vinyl & Additive Technology, Jun. 2002, vol. 8, No. 2, pp. 90-102.
Peter P. Klemchuk, et al., "Transformation Products of Hindered Phenolic Antioxidants and Colour Development in Polyolefins," Polymer Degradation and Stability 34 (1991), pp. 333-346.
S. Costanzi, et al., "New High Performance Phosphites," Elsevier, Polymer Degradation and Stability 73 (2001), pp. 425-430.
Enikö Földes, et al., "Efficiency and Mechanism of Phosphorus Antioxidants in Phillips Type Polyethylene," Elsevier, Science Direct, Polymer Degradation and Stability, 91 (2006), pp. 479-487.
Managing the Elements of Success, "Yellowing and Pinking of White PE/PP," AMPACET Corporation, Mar. 3, 2017, 6 pages; http://www.ampacet.com/faqs/yellowing-and-pinking-white-pe-pp/.
International Search Report and Written Opinion issued in corresponding application No. PCT/US2018/033921, dated Sep. 7, 2018, 13 pages.
IUPAC Compendium of Chemical Terminology, 2nd Ed. (1997).
Film Extrusion Manual—Process, Materials, Properties, TAPPI Press, 1992, 16 pages.
Modern Plastics Encyclopedia, Mid-Nov. 1995 Issue, vol. 72, No. 12, 3 pages.

METHODS FOR IMPROVING COLOR STABILITY IN POLYETHYLENE RESINS

REFERENCE TO RELATED APPLICATIONS

This application is a continuation application of co-pending U.S. patent application Ser. No. 15/985,797, filed on May 22, 2018, now U.S. Pat. No. 10,703,886, which claims the benefit of U.S. Provisional Patent Application No. 62/510,787, filed on May 25, 2017, the disclosures of which are incorporated herein by reference in their entirety.

BACKGROUND OF THE INVENTION

Ethylene polymers such as high density polyethylene (HDPE) homopolymer or copolymer and linear low density polyethylene (LLDPE) copolymer can be produced using various combinations of catalyst systems and polymerization processes. Ziegler-Natta, metallocene, and chromium-based catalyst systems are the most common catalyst systems used to produce such ethylene polymers.

However, regardless of the catalyst system, ethylene polymers that contain a phenolic antioxidant can exhibit color formation, such as yellowing, over time or when subjected to high temperatures. It would be beneficial to have an improved polymer stabilization system that provides long-term color stability to the ethylene polymer. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to polymer compositions having improved long-term color stability, or lower levels of color formation upon aging. Such polymer compositions can comprise an ethylene polymer, from about 150 ppm to about 350 ppm of zinc stearate and/or calcium stearate, from about 50 ppm to about 5000 ppm of a phenolic antioxidant, and from about 200 ppm to about 3000 ppm of a diphosphite antioxidant. Optionally, the polymer compositions can further comprise from about 200 ppm to about 3000 ppm of a monophosphite antioxidant. The ethylene polymer in these polymer compositions can be produced using a titanated chromium catalyst (i.e., the ethylene polymer can be a titanated chromium-based ethylene polymer).

Methods for improving the long-term color stability, or for reducing the color formation upon aging, of a polymer composition also are provided in the present invention. A representative method can comprise combining an ethylene polymer with an additive system to form the polymer composition, and in this method, the additive system can comprise zinc stearate and/or calcium stearate, a phenolic antioxidant, a diphosphite antioxidant, and optionally, a monophosphite antioxidant. The polymer composition can contain from about 150 ppm to about 350 ppm of zinc stearate and/or calcium stearate, from about 50 ppm to about 5000 ppm of the phenolic antioxidant, from about 200 ppm to about 3000 ppm of the diphosphite antioxidant, and optionally, from about 200 ppm to about 3000 ppm of the monophosphite antioxidant. The ethylene polymer in this method can be produced using a titanated chromium catalyst (i.e., the ethylene polymer can be a titanated chromium-based ethylene polymer).

Processes for producing polymer compositions with long-term color stability, or with lower levels of color formation upon aging, are disclosed in other aspects of this invention. For example, the process can comprise (a) contacting a chromium-based catalyst system with ethylene and an optional olefin comonomer under polymerization conditions in a polymerization reactor system to produce an ethylene polymer, and (b) combining the ethylene polymer with an additive system—containing zinc stearate and/or calcium stearate, a phenolic antioxidant, a diphosphite antioxidant, and optionally, a monophosphite antioxidant—to form the polymer composition. In this process, the polymer composition can comprise from about 150 ppm to about 350 ppm of zinc stearate and/or calcium stearate, from about 50 ppm to about 5000 ppm of the phenolic antioxidant, from about 200 ppm to about 3000 ppm of the diphosphite antioxidant, and optionally, from about 200 ppm to about 3000 ppm of the monophosphite antioxidant. Generally, the chromium-based catalyst system comprises a titanated chromium catalyst.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and processes/methods are described herein in terms of "comprising" various components or steps, the compositions and processes/methods can also "consist essentially of" or "consist of" the various components or steps, unless stated otherwise. For example, an additive system consistent with aspects of the present invention can comprise; alternatively, can consist essentially of; or alternatively, can consist of; zinc stearate, a phenolic antioxidant, and a diphosphite antioxidant.

The terms "a," "an," "the," etc., are intended to include plural alternatives, e.g., at least one, unless otherwise specified. For instance, the disclosure of "a phenolic antioxidant" or "a monophosphite antioxidant" is meant to encompass one, or mixtures or combinations of more than one, phenolic antioxidant or monophosphite antioxidant, respectively, unless otherwise specified.

The "ppm" (ppm by weight) of any additive or antioxidant component is based on the total weight of the polymer composition, unless specifically stated otherwise.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include ethylene homopolymers, copolymers, terpolymers, and so forth, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers, terpolymers, and so forth. Similarly, the scope of the term "polymerization" includes homopolymerization, copolymerization, terpolymerization, and so forth. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, if present and unless stated otherwise, and such configurations can include isotactic, syndiotactic, and random symmetries.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or chromium component after combining these materials. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that the weight ratio of the diphosphite antioxidant to the monophosphite antioxidant (diphosphite: monophosphite) can be in a range from about 5:1 to about 1:5 in certain aspects. By a disclosure that the weight ratio of diphosphite:monophosphite can be in a range from about 5:1 to about 1:5, the intent is to recite that the weight ratio can be any weight ratio within the range and, for example, can be equal to about 5:1, about 4:1, about 3:1, about 2:1, about 1.5:1, about 1:1, about 1:1.5, about 1:2, about 1:3, about 1:4, or about 1:5. Additionally, the weight ratio of diphosphite:monophosphite can be within any range from about 5:1 to about 1:5 (for example, the weight ratio can be in a range from about 1.2:1 to about 1:1.2), and this also includes any combination of ranges between about 5:1 and about 1:5. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to polymer compositions, methods for preparing the polymer compositions, and methods for using the polymer compositions to produce articles of manufacture. In particular, the present invention relates to polymer compositions with improved long-term color stability, as well as to polymer compositions with reduced color formation after aging.

Ethylene Polymers

The ethylene polymer employed in the polymer composition encompasses homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof, or alternatively, the comonomer can comprise 1-hexene. Typically, the amount of the comonomer, based on the total weight of monomer (ethylene) and comonomer, can be in a range from about 0.01 to about 20 wt. %, from about 0.05 to about 10 wt. %, from about 0.1 to about 5 wt. %, or from about 0.5 to about 8 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof, alternatively, an ethylene/1-butene copolymer, an ethylene/1-hexene copolymer, an ethylene/1-octene copolymer, or any combination thereof, or alternatively, an ethylene/1-hexene copolymer.

The densities of ethylene-based polymers disclosed herein often are greater than or equal to about 0.91 g/cm$^3$, for example, greater than or equal to about 0.92 g/cm$^3$, or greater than or equal to about 0.93 g/cm$^3$. Yet, in particular aspects, the density can be in a range from about 0.92 to about 0.96 g/cm$^3$, from about 0.93 to about 0.96 g/cm$^3$, from about 0.935 to about 0.96 g/cm$^3$, from about 0.93 to about 0.955 g/cm$^3$, from about 0.935 to about 0.955 g/cm$^3$, or from about 0.937 to about 0.954 g/cm$^3$.

While not being limited thereto, ethylene polymers described herein often can have a melt index (MI) in a range from 0 to about 2 g/10 min, from 0 to about 1.5 g/10 min, or from 0 to about 1 g/10 min, in some aspects, and from 0 to about 0.8 g/10 min, from 0 to about 0.5 g/10 min, from 0 to about 0.3 g/10 min, or from about 0.1 to about 0.4 g/10 min, in other aspects. Additionally or alternatively, the ethylene polymer can have a high load melt index (HLMI) in a range from about 0.5 to about 25 g/10 min, from about 5 to about 25 g/10 min, from about 0.5 to about 10 g/10 min, from about 1 to about 15 g/10 min, or from about 1 to about 6 g/10 min.

The ethylene polymers described herein can have any suitable molecular weight distribution, generally encompassing ratios of Mw/Mn ranging from about 1.5-2.5 up to about 40-50. In some aspects, the ethylene polymer can have a broad molecular weight distribution, with ratios of Mw/Mn that can range from as low as about 5, and up to about 50. For instance, the Mw/Mn of the ethylene polymer can be in a range from about 5 to about 40, from about 6 to about 45, from about 7 to about 35, from about 12 to about 45, or from about 15 to about 40.

In an aspect, ethylene polymers described herein can have a weight-average molecular weight (Mw) in a range from about 150,000 to about 750,000 g/mol, from about 175,000 to about 700,000 g/mol, or from about 175,000 to about 500,000 g/mol. In another aspect, ethylene polymers described herein can have a Mw in a range from about 200,000 to about 750,000 g/mol, from about 250,000 to about 750,000 g/mol, from about 250,000 to about 600,000 g/mol, or from about 300,000 to about 700,000 g/mol.

In one aspect, ethylene polymers of this invention can have a unimodal molecular weight distribution (as determined using gel permeation chromatography (GPC) or other suitable analytical technique). In a unimodal molecular weight distribution, there is a single identifiable peak. However, in another aspect, the ethylene polymer can have a bimodal molecular weight distribution, and in yet another aspect, a multimodal molecular weight distribution.

Moreover, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Consistent with aspects of this invention, the ethylene polymer can be produced using a titanated chromium catalyst system, as opposed to a Ziegler-Natta or metallocene-based catalyst system. Thus, in some aspects, the ethylene polymer can contain no measurable amount of zirconium, and additionally or alternatively, no measurable amount of hafnium (e.g., the ethylene polymer can be produced using a catalyst system that does not contain hafnium or zirconium). No measurable amount means below the level of detection. For example, the ethylene polymer can contain, independently, less than 0.2 ppm (by weight), less than 0.1 ppm, less than 0.08 ppm, or less than 0.05 ppm, of hafnium and/or zirconium.

Likewise, the ethylene polymer can contain no measurable amount of magnesium (e.g., the ethylene polymer can be produced using a catalyst system that does not contain magnesium). No measurable amount means below the level of detection. For example, the ethylene polymer can contain less than 5 ppm (by weight), less than 1 ppm, less than 0.5 ppm, or less than 0.1 ppm, of magnesium.

The ethylene polymer, in such aspects of the invention, can be categorized as a titanated chromium-based ethylene polymer. While not wishing to be bound by the following theory, it is believed that the particular molecular weight distribution, long and short chain branching distribution, polymer unsaturation characteristics, and catalyst residuals of titanated chromium-based ethylene polymers make them more susceptible to color formation when a phenolic antioxidant is present, to a much greater extent than ethylene polymers produced using metallocene or Ziegler-Natta catalyst systems.

Illustrative examples of suitable ethylene polymers that can be used in the polymer compositions disclosed herein, and can benefit from improved long-term color stability, include chromium-catalyzed ethylene polymers and titanated chromium-based ethylene polymers, such as can be produced in slurry polymerization reactors (e.g., loop slurry reactors).

While not being limited thereto, the ethylene polymer can contain an amount of chromium (in ppm by weight) that often ranges from about 0.5 ppm to about 15 ppm, from about 0.5 ppm to about 10 ppm, from about 1 ppm to about 15 ppm, or from about 1 ppm to about 10 ppm, of chromium. Also, while not being limited thereto, the ethylene polymer can contain an amount of titanium (in ppm by weight) that often ranges from about 0.5 ppm to about 15 ppm, from about 0.5 ppm to about 10 ppm, from about 1 ppm to about 15 ppm, or from about 1 ppm to about 10 ppm, of titanium.

In accordance with an aspect of this invention, the ethylene polymer can be described by its unsaturation characteristics. For example, the ratio of (vinylene+trisubstituted+vinylidene groups)/vinyl groups of the polymer (amounts per million total carbon atoms) can fall within a range from about 0.15 to about 0.7; alternatively, from about 0.15 to about 0.6; alternatively, from about 0.15 to about 0.5; alternatively, from about 0.15 to about 0.45; alternatively, from about 0.18 to about 0.6; alternatively, from about 0.18 to about 0.5; alternatively, from about 0.18 to about 0.45; or alternatively, from about 0.21 to about 0.41.

Additionally or alternatively, the ethylene polymer can be characterized by a ratio of (vinylene+trisubstituted+vinylidene groups)/total unsaturated groups of the polymer (amounts per million total carbon atoms) within a range from about 0.12 to about 0.5, from about 0.12 to about 0.4, from about 0.12 to about 0.35, from about 0.14 to about 0.5, from about 0.14 to about 0.4, from about 0.14 to about 0.35, from about 0.16 to about 0.45, from about 0.16 to about 0.35, or from about 0.18 to about 0.29.

Additive Systems

The additive system employed in the polymer composition also can be referred to as an additive package or an additive composition, and can contain zinc stearate and/or calcium stearate, a phenolic antioxidant, and a diphosphite antioxidant. One or more than one phenolic antioxidant can be present in the additive system, and one or more than one diphosphite antioxidant can be present in the additive system. Other primary antioxidants can be used in place of, or in combination with, the phenolic antioxidant, and illustrative and non-limiting examples include hydroxyl amines, lactones, HALS additives, and the like, or any combination thereof. In a further aspect of this invention, the additive package can contain zinc stearate and/or calcium stearate, a phenolic antioxidant, a diphosphite antioxidant, and a monophosphite antioxidant. If used, one or more than one monophosphite antioxidant can be present in the additive system.

In one aspect of the invention, the polymer composition contains zinc stearate, while in another aspect, the polymer composition contains calcium stearate, and in yet another aspect, the polymer composition contains both zinc stearate and calcium stearate. While not being limited thereto, the amount of zinc stearate and/or calcium stearate in the polymer composition (individually, or a total if both are present) often ranges from about 150 ppm to about 350 ppm. Illustrative and non-limiting ranges for the amount of zinc stearate and/or calcium stearate in the polymer composition can include from about 150 ppm to about 300 ppm, from about 200 ppm to about 350 ppm, from about 175 ppm to about 325 ppm, or from about 200 ppm to about 300 ppm, and the like.

Likewise, the amount of the phenolic antioxidant (or antioxidants) in the polymer composition is not particularly limited. For example, the phenolic antioxidant can be present at an amount in a range from about 50 ppm to about 5000 ppm; alternatively, from about 150 ppm to about 1500 ppm; alternatively, from about 200 ppm to about 2500 ppm; alternatively, from about 300 ppm to about 1500 ppm; or alternatively, from about 500 ppm to about 1000 ppm.

Any suitable phenolic antioxidant, or combination of phenolic antioxidants, can be used in the polymer composition. In one aspect, the phenolic antioxidant can comprise IRGANOX™ 1010 (pentaerythritol tetrakis(3-(3,5-di-tert-butyl-4-hydroxyphenyl) propionate), IRGANOX™ 1076 (octadecyl-3-(3,5-di-tertbutyl-4-hydroxyphenyl) propionate), IRGANOX™ 1330 (1,3,5-trimethyl-2,4,6-tris(3,5-di-tert-butyl-4-hydroxybenzyl)benzene), and the like, or any combination thereof. Other suitable phenolic antioxidants are known to those of skill in the art, and likewise can be used in the polymer compositions encompassed herein.

The amount of the diphosphite antioxidant (or antioxidants) in the polymer composition is not particularly limited. In one aspect, the diphosphite antioxidant can be present at an amount in a range from about 200 ppm to about 3000 ppm, and in another aspect, from about 500 ppm to about 2000 ppm, and in yet another aspect, from about 750 ppm to about 3000 ppm, and in still another aspect, from about 1000 ppm to about 2500 ppm.

Any suitable diphosphite antioxidant, or combination of diphosphite antioxidants, can be used in the polymer composition. In some aspects, the diphosphite antioxidant can comprise ULTRANOX™ 627A (bis(2,4-di-t-butylphenyl) pentaerythritol diphosphite plus stabilizer), ULTRANOX™ 626 (bis(2,4-di-t-butylphenyl) pentaerythritol diphosphite), PEP-36 (bis (2,6-di-tert-butyl-4-methylphenyl) pentaerythritol diphosphate), DOVERPHOS™ 9228 (bis(2,4-dicumylphenyl) pentaerythritol diphosphate), DOVERPHOS™ S9228T (bis(2,4-dicumylphenyl) pentaerythritol diphosphite plus stabilizer), and the like, or any combination thereof. Other suitable diphosphite antioxidants are known to those of skill in the art, and likewise can be used in the polymer compositions encompassed herein.

When used, the amount of the monophosphite antioxidant (or antioxidants) in the polymer composition, generally, can vary over the same range as that of the diphosphite antioxidant. Thus, the monophosphite antioxidant can be present in the polymer composition at an amount in a range from about 200 ppm to about 3000 ppm, from about 500 ppm to about 2000 ppm, from about 750 ppm to about 3000 ppm, or from about 1000 ppm to about 2500 ppm, and the like. Often, the weight ratio of the diphosphite antioxidant to the monophosphite antioxidant (diphosphite:monophosphite) in the polymer composition can fall within a range from about 10:1 to about 1:10. More typically, the weight ratio of diphosphite:monophosphite can be in a range from about 5:1 to about 1:5, from about 2:1 to about 1:2, from about 1.5:1 to about 1:1.5, or from about 1.2:1 to about 1:1.2, and the like.

Any suitable monophosphite antioxidant, or combination of monophosphite antioxidants, can be used in the polymer composition. In some aspects, the monophosphite antioxidant can comprise IRGAFOS™ 168 (tris(2,4,6-di-tert-butylphenyl) phosphite), HP-10 (2,2'-methylenebis(2,4-di-tert-butylphenyl) 2-ethylhexyl phosphite), and the like, or any combination thereof. Other suitable monophosphite antioxidants are known to those of skill in the art, and likewise can be used in the polymer compositions encompassed herein.

Catalyst Systems and Polymerization Processes

In accordance with aspects of the present invention, the ethylene polymer can be produced using a chromium-based catalyst system. An illustrative polymerization process can comprise contacting a chromium-based catalyst system with ethylene and an optional olefin comonomer under polymerization conditions in a polymerization reactor system to produce the ethylene polymer. The chromium-based catalyst system can contain a titanated chromium catalyst in aspects of this invention. Illustrative examples of such catalysts include MAGNAPORE™ 963, MAGNAPORE™ 964, and the like. Other suitable chromium catalysts are known to those of skill in the art, and likewise can be used to produce the ethylene polymer encompassed herein.

The chromium-based catalyst system (e.g., containing a titanated chromium catalyst) also can contain a co-catalyst. When present, the co-catalyst can include, but is not limited to, metal alkyl, or organometal co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Further, aluminoxane compounds, organoboron or organoborate compounds, ionizing ionic compounds, and the like, or combination thereof, can be used in the chromium-based catalyst system.

Ethylene polymers can be produced from the chromium-based catalyst system using any suitable olefin polymerization process using various types of polymerization reactors, polymerization reactor systems, and polymerization reaction conditions. As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof, or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the ethylene polymer. A suitable polymerization temperature can be any temperature below the de-polymerization temperature according to the Gibbs Free energy equation. Typically, this includes from about 60° C. to about 280° C., for example, or from about 60° C. to about 185° C., depending upon the type of polymerization reactor(s). In some reactor systems, the polymerization temperature generally can be within a range from about 60° C. to about 115° C., or from about 130° C. to about 180° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages to the polymerization reaction process.

Olefin comonomers that can be employed with catalyst compositions and polymerization processes of this invention typically can include olefin compounds having from 3 to 20 carbon atoms per molecule and having at least one olefinic double bond. In an aspect, the olefin comonomer can comprise a $C_3$-$C_{20}$ olefin; alternatively, a $C_3$-$C_{20}$ α-olefin; alternatively, a $C_3$-$C_{10}$ olefin; alternatively, a $C_3$-$C_{10}$ α-olefin; alternatively, the olefin comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Accordingly, the ethylene polymer of this invention can comprise an ethylene/α-olefin copolymer and/or an ethylene homopolymer. In some aspects, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

Polymer Compositions

Polymer compositions having improved long-term color stability, or lower levels of color formation after aging, are disclosed herein. One such polymer composition can comprise an ethylene polymer, from about 150 ppm to about 350 ppm of zinc stearate and/or calcium stearate, from about 50 ppm to about 5000 ppm of a phenolic antioxidant, from about 200 ppm to about 3000 ppm of a diphosphite antioxidant, and optionally, from about 200 ppm to about 3000 ppm of a monophosphite antioxidant.

The present invention also encompasses methods for improving the long-term color stability, or for reducing the color formation after aging, of a polymer composition. One such method can comprise combining an ethylene polymer with an additive system to form the polymer composition, and in this method, the additive system can comprise zinc stearate and/or calcium stearate, a phenolic antioxidant, a diphosphite antioxidant, and optionally, a monophosphite antioxidant. The resultant polymer composition can contain from about 150 ppm to about 350 ppm of zinc stearate and/or calcium stearate, from about 50 ppm to about 5000 ppm of the phenolic antioxidant, from about 200 ppm to about 3000 ppm of the diphosphite antioxidant, and optionally, from about 200 ppm to about 3000 ppm of the monophosphite antioxidant.

The present invention also encompasses processes for producing polymer compositions with long-term color stability, or with lower levels of color formation. One such process can comprise (a) contacting a chromium-based catalyst system with ethylene and an optional olefin comonomer under polymerization conditions in a polymerization reactor system to produce an ethylene polymer, and (b) combining the ethylene polymer with an additive system to form the polymer composition. In this process, the additive system can comprise zinc stearate and/or calcium stearate, a phenolic antioxidant, a diphosphite antioxidant, and optionally, a monophosphite antioxidant. The resultant polymer composition can contain from about 150 ppm to about 350 ppm of zinc stearate and/or calcium stearate, from about 50 ppm to about 5000 ppm of the phenolic antioxidant, from about 200 ppm to about 3000 ppm of the diphosphite antioxidant, and optionally, from about 200 ppm to about 3000 ppm of the monophosphite antioxidant.

Generally, the features of the polymer compositions, methods, and processes disclosed herein (for example, the characteristics of the ethylene polymer, the amount of zinc stearate and/or calcium stearate, the specific phenolic antioxidant and its loading, and the specific diphosphite antioxidant and its loading, among others) are independently described herein and these features can be combined in any combination to further describe the disclosed compositions, methods, and processes. Moreover, other steps can be conducted before, during, and/or after any of the steps listed in the disclosed methods and processes, unless stated otherwise.

Consistent with aspects of this invention, the polymer composition can be in the form of pellets, often referred to as polymer resin pellets. Moreover, in addition to the additive system (zinc stearate and/or calcium stearate, and the particular antioxidants), the polymer composition also can contain other additives, non-limiting examples of which can include an antiblock additive, a slip additive, a colorant, a filler, a UV additive, and the like, as well as any combination thereof.

The additive system can be combined with the ethylene polymer (and any additional additive, such as slip or antiblock, can be combined with the ethylene polymer) using any suitable technique, and at any time after formation of the ethylene polymer in a polymerization process, and prior to fabrication into an article of manufacture. Exemplary methods of combining the additive system with the ethylene polymer component include, but are not limited to, blending, mixing, melt processing, extruding, and the like, or combinations thereof. The additive system can be pre-blended together and then combined with the ethylene polymer, or each additive can be combined individually with the ethylene polymer. For instance, the additive system can be combined with the ethylene polymer after polymerization, but prior to pelletizing of the ethylene polymer resin, such as in a pelletizing extruder (e.g., single screw extrusion, twin screw extrusion, etc.). The present invention is not limited to any particular method of forming the polymer compositions disclosed herein.

The polymer compositions disclosed herein, and polymer compositions produced by any method or process disclosed herein, can have improved long-term color stability, and as well, can have reduced color formation after aging. For instance, one benefit of the present invention is that resin pellets made from the polymer compositions disclosed herein can be stored for long periods of time at ambient conditions without unacceptable color formation (e.g., yellowing), or stored for long periods of time at ambient conditions where the color is stable over time (e.g., without significant color changes). While not wishing to be bound by the following theory, it is believed that additive systems that work well for reducing yellow/off-color formation in high temperature, multi-pass extrusion experiments (i.e., processing stability experiments, typically quantified by yellowness index) do not translate to long-term color stability under ambient conditions. Moreover, as shown in the examples that follow, a polymer composition having superior initial color is not a good indication of the long-term color performance of the polymer composition after aging. Generally, practical long-term color stability for the polymer compositions disclosed herein extends for 3 months or more, or even 6 months or more, and at ambient temperatures typically ranging from 25 to 45° C., and in the presence or absence of light.

To accelerate any time-dependent color formation, testing is typically conducted at higher temperatures, often ranging from 60 to 80° C., as demonstrated in the examples that follow. Under these conditions, and unexpectedly, the polymer compositions of this invention can have a PE color number of at least 200 after storage for 10 weeks, or for 15 weeks, or for 20 weeks, or for 25 weeks, at a temperature of 60° C. Additionally, or alternatively, the polymer composition can have a PE color number of at least 200 after storage for 3 weeks, or for 4 weeks, or for 6 weeks, or for 8 weeks, or for 10 weeks, at a temperature of 80° C. Since these time-temperature conditions are designed to simulate long-term color stability at lower temperatures, but accelerated to obtain test data more quickly, the polymer compositions are stored in (or exposed to) an ambient/air atmosphere (i.e., not an inert atmosphere).

Also surprisingly, the polymer compositions of this invention can have a PE color number that is higher than that of a comparable (an otherwise equivalent) polymer composition that contains 500 ppm (or more than 500 ppm, or 0 ppm) of zinc stearate and/or calcium stearate. This comparison is meant to be under the same time-temperature conditions, such that the only difference is the amount of zinc stearate present in the polymer composition (or calcium stearate present in the polymer composition, or both zinc stearate and calcium stearate present in the polymer composition).

Unexpectedly, it was found that larger amounts of zinc stearate and/or calcium stearate in the polymer compositions disclosed herein actually result in more color formation and yellowing. Thus, using an amount of zinc stearate and/or calcium stearate of 150-350 ppm in the polymer composition can provide superior long-term color stability of the composition for 3 months or more (or 6 months or more) at ambient temperatures of 25-45° C., as compared to polymer compositions containing more (or less) than 150-350 ppm. These results are demonstrated by the examples that follow, in which the polymer composition containing 150-350 ppm of zinc stearate had a higher PE color number after storage for 4 weeks, for 6 weeks, for 8 weeks, and for 10 weeks, at a temperature of 80° C., than that of otherwise identical polymer compositions containing more (or less) than 150-350 zinc stearate.

The unexpected long-term color stability of the disclosed polymer compositions also can be quantified by Δcolor/Δtime, which is defined as the difference between the maximum PE color number and the minimum PE color number in the 1-10 week range, conducted at 80° C. in an ambient atmosphere. Unexpectedly, the polymer compositions contemplated herein can have a Δcolor/Δtime of less than 45, and in some aspects, less than 40, less than 35, less than 30, less than 25, or less than 20.

Additionally or alternatively, the polymer compositions of this invention can have a Δcolor/Δtime that is less than that of a comparable (an otherwise equivalent) polymer composition that contains 500 ppm (or more than 500 ppm, or 0 ppm) of zinc stearate and/or calcium stearate. This comparison is meant to be under the same time-temperature conditions, such that the only difference is the amount of zinc stearate present in the polymer composition (or calcium stearate present in the polymer composition, or both zinc stearate and calcium stearate present in the polymer composition).

The PE color number is described, for example, in U.S. Pat. No. 6,613,823, which is incorporated herein by reference in its entirety. A higher PE color number indicates a whiter polymer with less yellow/off-color, and can be calculated from Hunter "a", "b", and "L" values by the following formula:

$$PE \text{ color number} = L(0.0382L - 0.056a - 0.3374b).$$

Generally, a polymer having a PE color number of 180 or less will have a yellow off-color that is visually noticeable.

Articles of manufacture can be formed from, and/or can comprise, the polymer composition of this invention and, accordingly, are encompassed herein. For example, articles which can comprise polymer compositions of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives (e.g., a slip additive, an antiblock additive) are often added to the polymer composition in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of the polymer compositions described herein, and the article of manufacture can be or can comprise a film, a pipe, or a blow molded product.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 (2013) at 190° C. with a 2,160 gram weight, and high load melt index (HLMI, g/10 min) can be determined in accordance with ASTM D1238 (2013) at 190° C. with a 21,600 gram weight. Polymer density can be determined in grams per cubic centimeter ($g/cm^3$) on a compression molded sample, cooled at about 15° C. per hour, and conditioned for about 40 hours at room temperature in accordance with ASTM D1505 (2010) and ASTM D4703 (2016).

Molecular weights and molecular weight distributions can be obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) is set at 1 mL/min, and polymer solution concentrations are in the range of 1.0-1.5 mg/mL, depending on the molecular weight. Sample preparation is conducted at 150° C. for nominally 4 hr with occasional and gentle agitation, before the solutions are transferred to sample vials for injection. An injection volume of about 200 μL is used. The integral calibration method is used to deduce molecular weights and molecular weight distributions using a Chevron Phillips Chemical Company's HDPE polyethylene resin, MARLEX® BHB5003, as the broad standard. The integral table of the broad standard can be pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

All formulations were compounded on a ZSK-30 twin screw extruder with a 30" screw length under a nitrogen purge. Powder form additives were bag blended with a titanated-chromium based polyethylene (nominal density of 0.954 $g/cm^3$ and HLMI of 5.5 g/10 min) fluff prior to feeding into the extruder. After receiving the initial samples from compounding, the formulations were processed on a Braebender single screw extruder under ambient atmosphere. The heating and screw speed were adjusted to obtain a melt temperature of 275° C. for the polymer strand (Zone 1=250° C., Zone 2=245° C., Zone 3=245° C., Zone 4=230° C., Screw RPM=75). The polymer strand was cooled in a water bath and pelletized. Samples of the extruded pellets were aged in a forced air oven at 60° C. or 80° C.

Color measurements were analyzed on a Hunterlabs Labscan XE. This analysis provided Hunter "a" and Hunter "b" color values for each sample. The Hunter "a" value indicates color variation between red and green: negative Hunter "a" values indicate greenness, while positive Hunter "a" values indicate redness. The Hunter "b" value indicates color variation between blue and yellow: negative Hunter "b" numbers indicate blueness, while positive Hunter "b" values indicate yellowness. The Hunter "L" value indicates color variation between white and black: negative Hunter "L" values indicate blackness, while positive Hunter "L" values indicate whiteness. Hunter "a", "b", and "L" values were converted to a PE color number, in which a higher PE color number indicates a whiter polymer, by the following formula:

PE color number=$L(0.0382L-0.056a-0.3374b)$.

Metals content, such as the amount of catalyst residue in the polymer composition, can be determined by ICP analysis on a PerkinElmer Optima 8300 instrument. Polymer samples can be ashed in a Thermolyne furnace with sulfuric acid overnight, followed by acid digestion in a HotBlock with HCl and HNO3 (3:1 v:v).

NMR data for vinylene groups, trisubstituted groups, vinylidene groups, vinyl groups, and total unsaturated groups were determined as follows. Polymer samples were dissolved in deuterated NMR solvent 1,1,2,2-Tetrachloro-ethane-d2 (TCE-d2). The sample and solvent mixture was heated in a heating block at 130° C. for 4-5 hours. The mixture was occasionally stirred with a stainless-steel stirrer to ensure homogeneous mixing. The resulting solution was then left overnight (~15-16 hours) in the heating block to ensure complete disentanglement of the polymer chains. The final concentration of the samples was about 3 wt. %. The sample was equilibrated at 125° C. inside the probe for 15 minutes before data collection started.

Two different proton NMR data were collected for each sample: regular (control) and Presaturated proton NMR. The data were collected in a 500 MHz NMR instrument which is comprised of a 500 MHz Oxford magnet and a Bruker Avance III HD console. A Bruker 5 mm BBI probe equipped with z-gradient was used for the data collection. The data were processed with Bruker's Topspin software (version 3.2 pl 6).

Regular proton NMR data was collected with zg pulse sequence from Bruker's pulse sequence library using the following acquisition parameters: 5.0 s relaxation delay, 7.4 μs pulse width, 14 W pulse power, 4 dummy scans, 5.0 s acquisition time, 1024 scans, and 9 ppm spectral window. The data was processed with 0.3 Hz line broadening and zero filled to 65 k data points. The spectrum was referenced to the residual proton peak of TCE-d2 (6.0 ppm).

Presaturation proton NMR spectrum was collected with zgpr pulse sequence from Bruker's pulse sequence library using the following acquisition parameters: 5.0 s relaxation delay, 7.4 μs pulse width, 14 W pulse power, 4 dummy scans, 5.0 s acquisition time, 1024 scans, and 20 ppm spectral window. The data was processed with 0.3 Hz line broadening and zero filled to 131 k data points. The transmitter offset was placed at the center of the proton peak arising from the backbone proton atoms of polyethylene (PE) for efficient suppression of that peak. This PE backbone peak appears in between 1.40-1.35 ppm region. The spectrum was referenced to the residual proton peak of TCE-d2 (6.0 ppm).

In the regular and presaturation proton spectrum, the area under the solvent peak was calibrated to 100. The regular proton spectrum was integrated for the area of the solvent and the polymer peak (3.4-0.25 ppm). The Presaturation proton spectrum was integrated for the solvent and the internal and terminal olefin peaks. The integral area was normalized to 1000 in order to report the content of the olefin structure fragments per $10^6$ carbon atoms. The following equations were used to calculate the olefin contents (I=integral area, and N=number of species):

$$N_{CH2}=I_{polymer}/2$$

$$N_{vinylene}=I_{vinylene}/2$$

$$N_{trisub}=I_{trisub}$$

$$N_{vinyl}=I_{vinyl}/2$$

$$N_{vinylidene}=I_{vinylidene}/2$$

$$N_{olefin}/10^6\ C=N_{olefin}/N_{CH2}\times 10^6$$

Example 1

Figure 1:
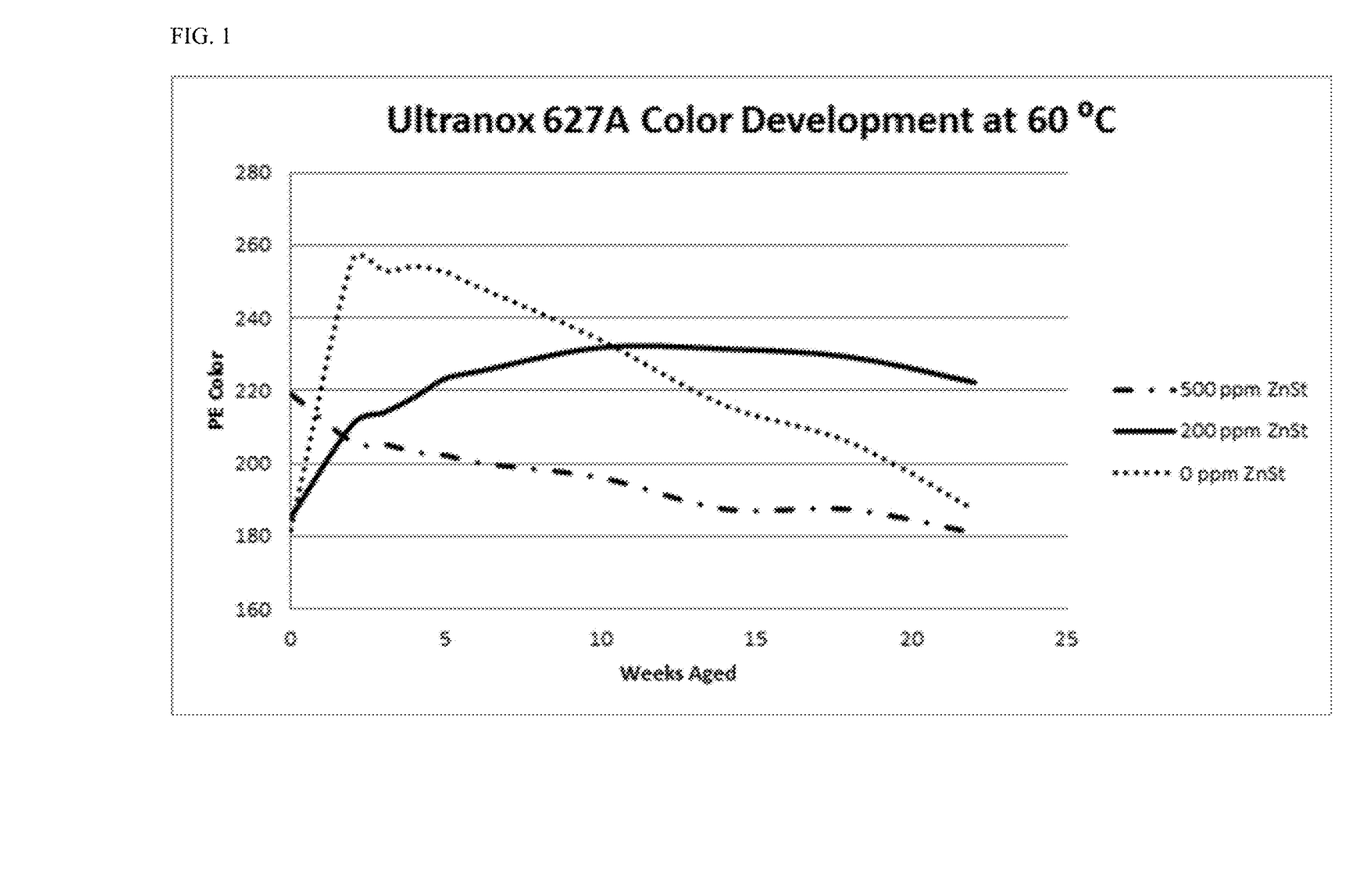
FIG. 1 presents a plot of the PE Color Number versus time at 60° C. for the polymer compositions of Example 1, containing a diphosphite antioxidant and different loadings of zinc stearate.

In Example 1, polymer compositions were produced with the titanated-chromium based polyethylene, 750 ppm of IRGANOX™ 1010, 750 ppm of IRGAFOS™ 168, 750 ppm of ULTRANOX™ 627A, and either 0, 200, or 500 ppm of zinc stearate.

FIG. 1 illustrates the PE Color Number for pellets of the three polymer compositions after aging at 60° C. for over 20 weeks. A higher PE color number reflects less yellow/off-color formation. Unexpectedly, the polymer composition containing 200 ppm of zinc stearate had the most consistent and stable color; the PE color number was relatively constant at 220-240 from 5 weeks to over 20 weeks. Additionally, the PE color number for the polymer composition with 200 ppm of zinc stearate was far superior to that of an otherwise identical composition containing 500 ppm of zinc stearate.

Example 2

Figure 2:
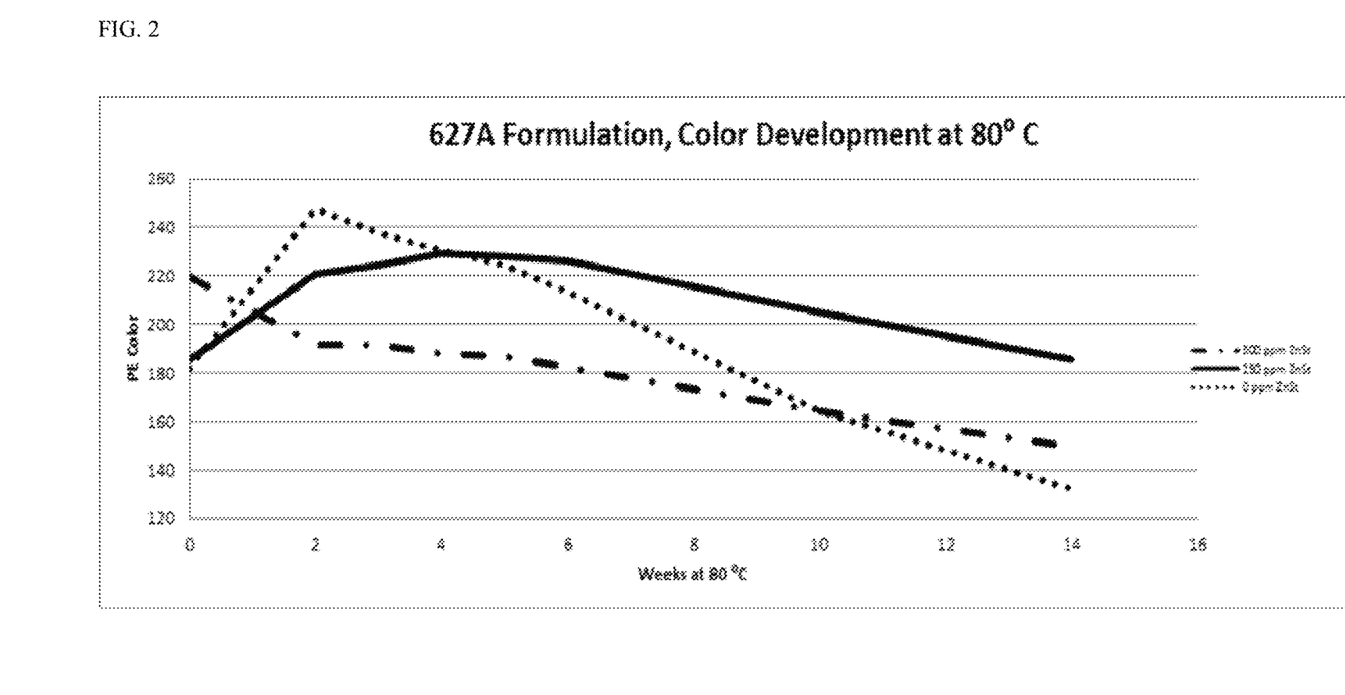
FIG. 2 presents a plot of the PE Color Number versus time at 80° C. for the polymer compositions of Example 2, containing a diphosphite antioxidant and different loadings of zinc stearate.

In Example 2, polymer compositions were produced with the titanated-chromium based polyethylene, 750 ppm of IRGANOX™ 1010, 750 ppm of IRGAFOS™ 168, 750 ppm of ULTRANOX™ 627A, and either 0, 250, or 500 ppm of zinc stearate.

FIG. 2 illustrates the PE Color Number for pellets of the three polymer compositions after aging at 80° C. for 14 weeks. A higher PE color number reflects less yellow/off-color formation. Unexpectedly, the polymer composition containing 250 ppm of zinc stearate had the most stable color number and least off-color; the PE color number was over 200 for 2-10 weeks at 80° C. Additionally, the PE color number for the polymer composition with 250 ppm of zinc stearate was far superior to that of an otherwise identical composition containing 500 ppm of zinc stearate.

The Δcolor/Δtime for the polymer composition with 250 ppm of zinc stearate in the 1-10 week range at 80° C. was only about 30, whereas the Δcolor/Δtime for the polymer composition with 500 ppm of zinc stearate was about 40, and the Δcolor/Δtime for the polymer composition with 0 ppm of zinc stearate was about 80. Thus, not only was the aged PE color number higher for the polymer composition with 250 ppm of zinc stearate, but the long-term stability of the color was superior.

Example 3

Figure 3:
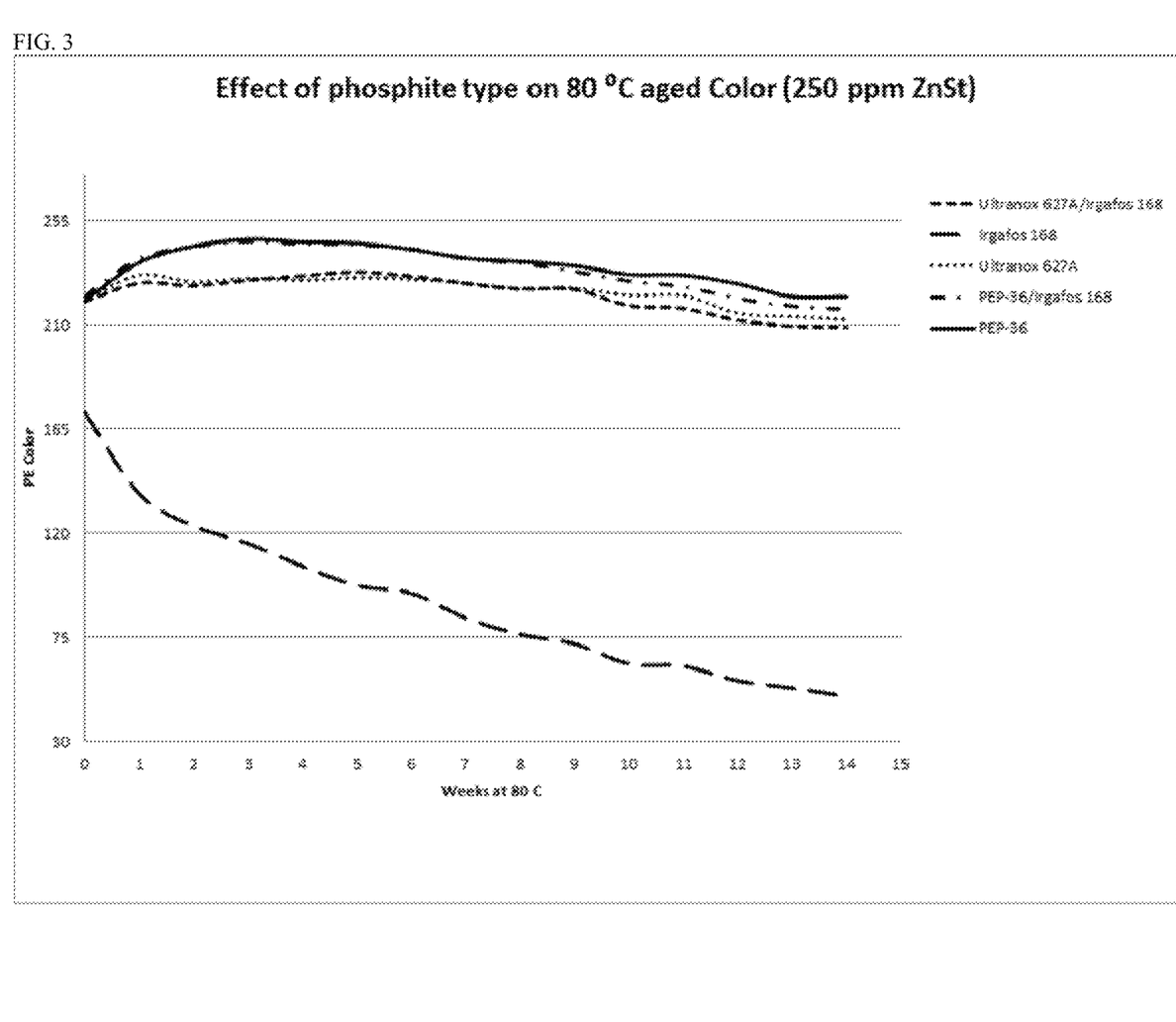
FIG. 3 presents a plot of the PE Color Number versus time at 80° C. for the polymer compositions of Example 3, containing 250 ppm of zinc stearate and different antioxidants.

In Example 3, polymer compositions were produced with the titanated-chromium based polyethylene, 750 ppm of IRGANOX™ 1010, 750 ppm of each phosphite antioxidant (750 ppm total, if only one, and 1500 ppm total, if two), and 250 ppm of zinc stearate.

FIG. 3 illustrates the PE Color Number for pellets of the five polymer compositions after aging at 80° C. for 14 weeks. A higher PE color number reflects less yellow/off-color formation. Unexpectedly, at 250 ppm of zinc stearate, all of the polymer compositions containing either a diphosphite or both diphosphite and monophosphite (1:1 weight ratio) had excellent long-term color stability; the PE color numbers were over 210 for up to 14 weeks at 80° C. Additionally, the PE color number for the polymer composition containing only a monophosphite (IRGAFOS' 168) with 250 ppm of zinc stearate was far worse than that of otherwise identical compositions containing either a diphosphite or both diphosphite and monophosphite.

Example 4

Figure 4:
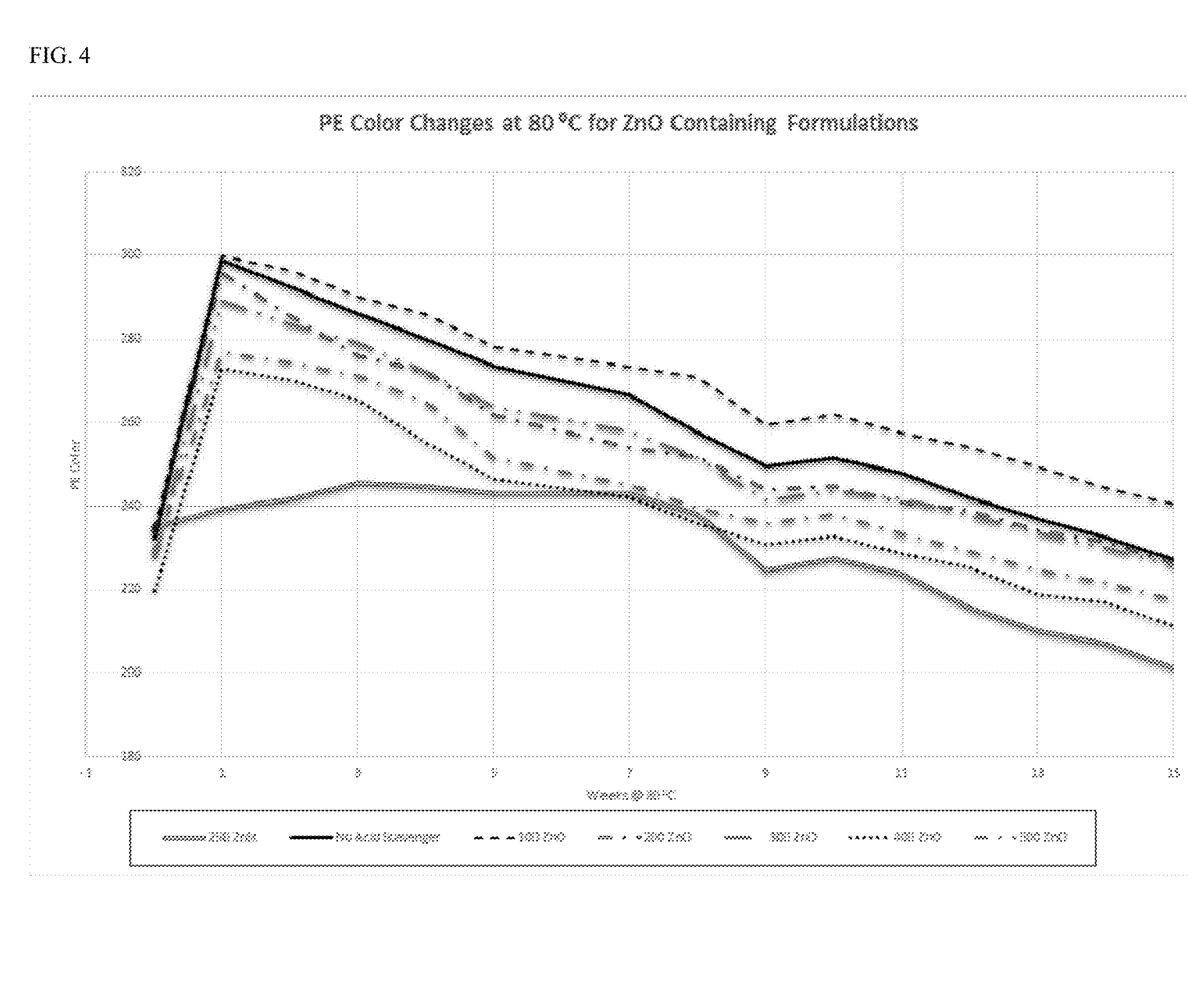
FIG. 4 presents a plot of the PE Color Number versus time at 80° C. for the polymer compositions of Example 4, containing a diphosphite antioxidant and different loadings of zinc oxide.

In Example 4, polymer compositions were produced with the titanated-chromium based polyethylene, 750 ppm of IRGANOX™ 1010, 750 ppm of IRGAFOS' 168, 750 ppm of ULTRANOX™ 627A, and either 250 ppm of zinc stearate or 0, 100, 200, 300, 400, or 500 ppm of zinc oxide.

FIG. 4 illustrates the PE Color Number for pellets of the seven polymer compositions after aging at 80° C. for 15 weeks. A higher PE color number reflects less yellow/off-color formation. Unexpectedly, the polymer composition containing 250 ppm of zinc stearate has the most stable color, whereas all of the other polymer compositions (with either no acid scavenger or 100-500 ppm of zinc oxide) had large variations in color (from the highest color number to the lowest color number) over the 15 week test. For instance, the composition with no acid scavenger had a peak PE color number of 300, but decreased to approximately 230 over the test period. Also notably, the addition of zinc oxide at any level did not improve the color stability of the polymer composition (versus no acid scavenger). This stands in contrast to the surprising results found by using 250 ppm of zinc stearate in the polymer composition, which had a Δcolor/Δtime for the polymer composition of less than 20.

Example 5

Figure 5:
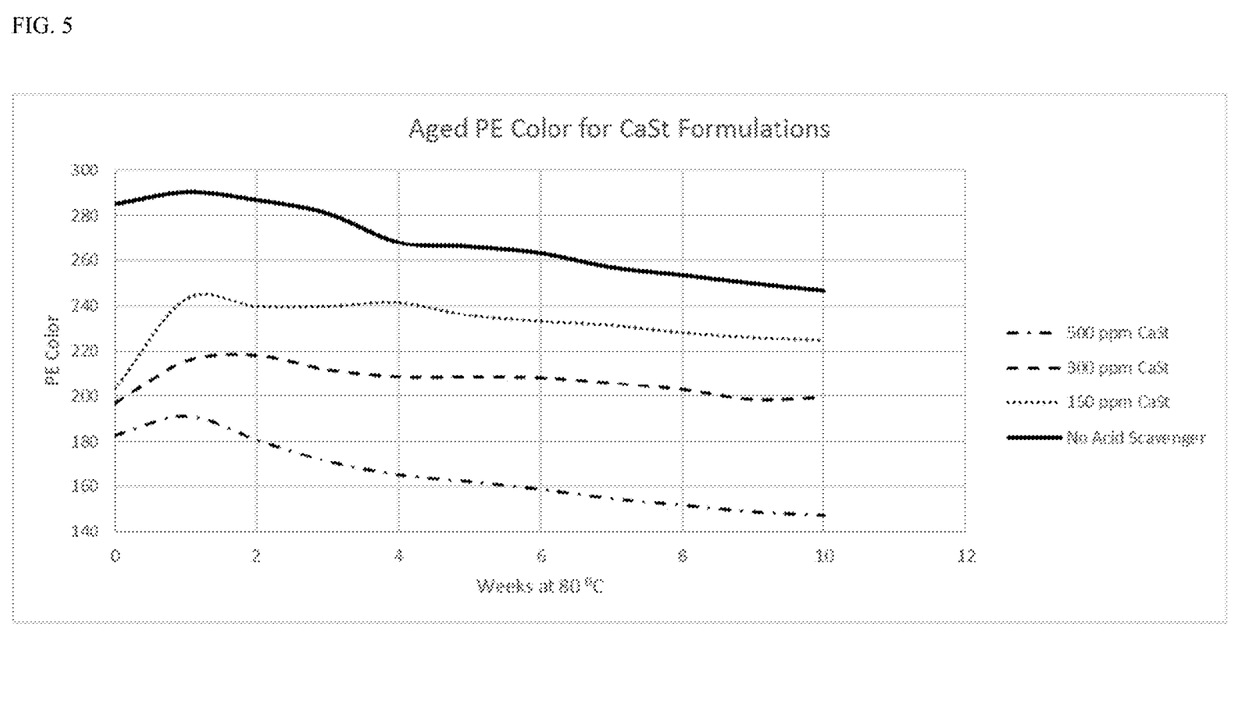
FIG. 5 presents a plot of the PE Color Number versus time at 80° C. for the polymer compositions of Example 5, containing a diphosphite antioxidant and different loadings of calcium stearate.

In Example 5, polymer compositions were produced with the titanated-chromium based polyethylene, 750 ppm of IRGANOX™ 1010, 750 ppm of IRGAFOS™ 168, 750 ppm of ULTRANOX™ 627A, and either 0, 150, 300, or 500 ppm of calcium stearate.

FIG. 5 illustrates the PE Color Number for pellets of the four polymer compositions after aging at 80° C. for 10 weeks. A higher PE color number reflects less yellow/off-color formation. Unexpectedly, the polymer composition containing 300 ppm of calcium stearate had the most stable color, whereas the polymer compositions with either no acid scavenger or 500 ppm of calcium stearate had large variations in color (from the highest color number to the lowest color number) over the 10 week test. For instance, the composition with no acid scavenger had a peak PE color number of 290, but decreased to approximately 250 over the test period (Δcolor/Δtime equal to 40). This stands in contrast to the surprising results found by using 300 ppm of calcium stearate in the polymer composition, which had a Δcolor/Δtime for the polymer composition of approximately 20.

Example 6

In Example 6, titanated chromium-based polyethylenes and chromium-based polyethylenes were analyzed via NMR to determine the respective amounts (per million total carbon atoms) of vinylene unsaturation, trisubstituted unsaturation, vinylidene unsaturation, vinyl unsaturation, and total unsaturation. The results are summarized in Table I. The titanated chromium resins had ratios of (vinylene+trisubstituted+vinylidene groups)/vinyl groups in the 0.21-0.41 range, whereas the ratios were in the 0.06-0.11 range for the chromium resins. Similarly, the titanated chromium resins had ratios of (vinylene+trisubstituted+vinylidene groups)/total unsaturated groups in the 0.18-0.29 range, whereas the ratios were in the 0.05-0.10 range for the chromium resins.

TABLE I

NMR summary.

| MI or HLMI (g/10 min) | Density (g/cc) | Form | Catalyst | Vinylene | Trisub | Vinylidene | Vinyl | (vinylene + trisub + vinylidene)/ vinyl | Total Unsaturated Groups | (vinylene + trisub + vinylidene)/ total |
|---|---|---|---|---|---|---|---|---|---|---|
| MI = 0.18 | 0.946 | Pellet | Ti Cr | 66 | 32 | 0 | 364 | 0.27 | 462 | 0.21 |
| MI = 0.20 | 0.938 | Pellet | Ti Cr | 67 | 8 | 55 | 611 | 0.21 | 741 | 0.18 |
| HLMI = 21 | 0.937 | Pellet | Ti Cr | 129 | 145 | 2 | 676 | 0.41 | 952 | 0.29 |
| MI = 0.35 | 0.955 | Pellet | Cr | 7 | 13 | 5 | 432 | 0.06 | 457 | 0.05 |
| HLMI = 10 | 0.948 | Fluff | Cr | 57 | 34 | 5 | 861 | 0.11 | 957 | 0.10 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A polymer composition comprising:

(i) an ethylene polymer;

(ii) from about 150 ppm to about 350 ppm of zinc stearate and/or calcium stearate;

(iii) from about 50 ppm to about 5000 ppm of a phenolic antioxidant; and (iv) from about 200 ppm to about 3000 ppm of a diphosphite antioxidant.

Aspect 2. A method for improving the long-term color stability (or for reducing the aged color formation) of a polymer composition, the method comprising:

combining (i) an ethylene polymer with an additive system comprising zinc stearate and/or calcium stearate, a phenolic antioxidant, and a diphosphite antioxidant, to form the polymer composition, wherein the polymer composition comprises:

(ii) from about 150 ppm to about 350 ppm of zinc stearate and/or calcium stearate;

(iii) from about 50 ppm to about 5000 ppm of the phenolic antioxidant; and (iv) from about 200 ppm to about 3000 ppm of the diphosphite antioxidant.

Aspect 3. A process for producing a polymer composition with long-term color stability (or with lower levels of color formation after aging), the process comprising:

(a) contacting a chromium-based catalyst system with ethylene and an optional olefin comonomer under polymerization conditions in a polymerization reactor system to produce (i) an ethylene polymer; and (b) combining the ethylene polymer with an additive system comprising zinc stearate and/or calcium stearate, a phenolic antioxidant, and a diphosphite antioxidant, to form the polymer composition, wherein the polymer composition comprises:

(ii) from about 150 ppm to about 350 ppm of zinc stearate and/or calcium stearate;

(iii) from about 50 ppm to about 5000 ppm of the phenolic antioxidant; and (iv) from about 200 ppm to about 3000 ppm of the diphosphite antioxidant.

Aspect 4. The composition, method, or process defined in any one of aspects 1-3, wherein the polymer composition further comprises from about 200 ppm to about 3000 ppm of a monophosphite antioxidant.

Aspect 5. The composition, method, or process defined in aspect 4, wherein a weight ratio of the diphosphite antioxidant to the monophosphite antioxidant (diphosphite:monophosphite) is in any range disclosed herein, e.g., from about 10:1 to about 1:10, from about 2:1 to about 1:2, from about 1.2:1 to about 1:1.2, etc.

Aspect 6. The composition, method, or process defined in any one of aspects 1-5, wherein the ethylene polymer has a Mw in any range disclosed herein, e.g., from about 150,000 to about 750,000 g/mol, from about 175,000 to about 500,000 g/mol, from about 250,000 to about 750,000 g/mol, etc.

Aspect 7. The composition, method, or process defined in any one of aspects 1-6, wherein the ethylene polymer has a ratio of Mw/Mn in any range disclosed herein, e.g., from about 5 to about 40, from about 7 to about 35, from about 15 to about 40, etc.

Aspect 8. The composition, method, or process defined in any one of aspects 1-7, wherein the ethylene polymer has a melt index (MI) in any range disclosed herein, e.g., from 0 to about 1 g/10 min, from 0 to about 0.5 g/10 min, from 0 to about 0.3 g/10 min, etc.

Aspect 9. The composition, method, or process defined in any one of aspects 1-8, wherein the ethylene polymer has a high load melt index (HLMI) in any range disclosed herein, e.g., from about 0.5 to about 25 g/10 min, from about 0.5 to about 10 g/10 min, from about 1 to about 15 g/10 min, etc.

Aspect 10. The composition, method, or process defined in any one of aspects 1-9, wherein the ethylene polymer has a density in any range disclosed herein, e.g., from about 0.92 to about 0.96 g/cm$^3$, from about 0.93 to about 0.96 g/cm$^3$, from about 0.935 to about 0.955 g/cm$^3$, etc.

Aspect 11. The composition, method, or process defined in any one of aspects 1-10, wherein the ethylene polymer has a unimodal molecular weight distribution.

Aspect 12. The composition, method, or process defined in any one of aspects 1-11, wherein the ethylene polymer is characterized by a ratio of (vinylene+trisubstituted+vinylidene groups)/vinyl groups in any range disclosed herein, e.g., from about 0.15 to about 0.7, from about 0.15 to about 0.5, from about 0.18 to about 0.6, etc.

Aspect 13. The composition, method, or process defined in any one of aspects 1-12, wherein the ethylene polymer is characterized by a ratio of (vinylene+trisubstituted+vinylidene groups)/total unsaturated groups in any range disclosed herein, e.g., from about 0.12 to about 0.5, from about 0.12 to about 0.35, from about 0.14 to about 0.4, etc.

Aspect 14. The composition, method, or process defined in any one of aspects 1-13, wherein the ethylene polymer is a single reactor product, e.g., not a post-reactor blend of two polymers, for instance, having different molecular weight characteristics.

Aspect 15. The composition, method, or process defined in any one of aspects 1-14, wherein the ethylene polymer comprises an ethylene homopolymer and/or an ethylene/α-olefin copolymer.

Aspect 16. The composition, method, or process defined in any one of aspects 1-15, wherein the ethylene polymer comprises an ethylene homopolymer, an ethylene/1-butene copolymer, an ethylene/1-hexene copolymer, and/or an ethylene/1-octene copolymer.

Aspect 17. The composition, method, or process defined in any one of aspects 1-16, wherein the ethylene polymer contains an amount (in ppm by weight) of zirconium and hafnium, independently, in any range disclosed herein, e.g., less than 0.2 ppm, less than 0.1 ppm, less than 0.08 ppm, less than 0.05 ppm, or no measurable amount (below the level of detection), of zirconium and/or hafnium.

Aspect 18. The composition, method, or process defined in any one of aspects 1-17, wherein the ethylene polymer contains an amount (in ppm by weight) of magnesium in any range disclosed herein, e.g., less than 5 ppm, less than 1 ppm, less than 0.5 ppm, less than 0.1 ppm, or no measurable amount (below the level of detection), of magnesium.

Aspect 19. The composition, method, or process defined in any one of aspects 1-18, wherein the ethylene polymer contains an amount (in ppm by weight) of chromium in any range disclosed herein, e.g., from about 0.5 ppm to about 15 ppm, from about 0.5 ppm to about 10 ppm, from about 1 ppm to about 15 ppm, or from about 1 ppm to about 10 ppm, of chromium.

Aspect 20. The composition, method, or process defined in any one of aspects 1-19, wherein the ethylene polymer contains an amount (in ppm by weight) of titanium in any range disclosed herein, e.g., from about 0.5 ppm to about 15 ppm, from about 0.5 ppm to about 10 ppm, from about 1 ppm to about 15 ppm, or from about 1 ppm to about 10 ppm, of titanium.

Aspect 21. The composition, method, or process defined in any one of aspects 1-20, wherein the ethylene polymer is a titanated chromium-based ethylene polymer (produced using a titanated chromium catalyst, or the chromium-based catalyst system comprises a titanated chromium catalyst).

Aspect 22. The composition, method, or process defined in any one of aspects 1-21, wherein the polymer composition contains an amount of the phenolic antioxidant in any range disclosed herein, e.g., from about 200 ppm to about 2500 ppm, from about 500 ppm to about 1000 ppm, etc.

Aspect 23. The composition, method, or process defined in any one of aspects 1-22, wherein the phenolic antioxidant comprises any suitable phenolic antioxidant, e.g., IRGANOX™ 1010.

Aspect 24. The composition, method, or process defined in any one of aspects 1-23, wherein the polymer composition contains an amount of the diphosphite antioxidant in any range disclosed herein, e.g., from about 750 ppm to about 3000 ppm, from about 1000 ppm to about 2500 ppm, etc.

Aspect 25. The composition, method, or process defined in any one of aspects 1-24, wherein the diphosphite antioxidant comprises any suitable diphosphite antioxidant, e.g., ULTRANOX™ 627A, ULTRANOX™ 626, PEP-36, DOVERPHOS™ 9228, etc., as well as combinations thereof.

Aspect 26. The composition, method, or process defined in any one of aspects 4-25, wherein the polymer composition contains an amount of the monophosphite antioxidant in any range disclosed herein, e.g., from about 750 ppm to about 3000 ppm, from about 1000 ppm to about 2500 ppm, etc.

Aspect 27. The composition, method, or process defined in any one of aspects 4-26, wherein the monophosphite antioxidant comprises any suitable monophosphite antioxidant, e.g., IRGAFOS™ 168, HP-10, etc., as well as combinations thereof.

Aspect 28. The composition, method, or process defined in any one of aspects 1-27, wherein the polymer composition contains zinc stearate and/or calcium stearate in any range disclosed herein, e.g., from about 150 ppm to about 300 ppm, from about 200 ppm to about 350 ppm, from about 175 ppm to about 325 ppm, from about 200 ppm to about 300 ppm, etc.

Aspect 29. The composition, method, or process defined in any one of aspects 1-28, wherein the polymer composition contains zinc stearate.

Aspect 30. The composition, method, or process defined in any one of aspects 1-28, wherein the polymer composition contains calcium stearate.

Aspect 31. The composition, method, or process defined in any one of aspects 1-28, wherein the polymer composition contains zinc stearate and calcium stearate.

Aspect 32. The composition, method, or process defined in any one of aspects 1-31, wherein the polymer composition is in the form of pellets.

Aspect 33. The composition, method, or process defined in any one of aspects 1-32, wherein the polymer composition further comprises at least one other additive selected from an antiblock additive, a slip additive, a colorant, a filler, a UV additive, or any combination thereof.

Aspect 34. The composition, method, or process defined in any one of aspects 1-33, wherein the polymer composition has a PE color number of at least 200 after storage (in air) for 10 weeks (or 15 weeks, or 20 weeks, or 25 weeks) at a temperature of 60° C.

Aspect 35. The composition, method, or process defined in any one of aspects 1-34, wherein the polymer composition has a PE color number of at least 200 after storage (in air) for 3 weeks (or 4 weeks, or 6 weeks, or 8 weeks, or 10 weeks) at a temperature of 80° C.

Aspect 36. The composition, method, or process defined in any one of aspects 1-35, wherein the polymer composition has a higher PE color number than that of a comparable (otherwise equivalent) polymer composition that contains 500 ppm (or more, or zero ppm) of zinc stearate and/or calcium stearate.

Aspect 37. The composition, method, or process defined in any one of aspects 1-36, wherein the polymer composition has a $\Delta$color/$\Delta$time in any range disclosed herein, e.g., less than 45, less than 40, less than 35, less than 30, less than 25, etc., and/or a lower $\Delta$color/$\Delta$time than that of a comparable (otherwise equivalent) polymer composition that contains 500 ppm (or more, or zero ppm) of zinc stearate and/or calcium stearate.

Aspect 38. An article produced from the polymer composition defined in any one of aspects 1-37.

Aspect 39. The article of aspect 38, wherein the article is a film, pipe, or blow molded article.

Aspect 40. The method or process defined in any one of aspects 2-37, wherein the step of combining comprises blending and/or melt processing (e.g., extrusion).

Aspect 41. The process defined in any one of aspects 3-37, wherein the reactor system comprises one reactor.

Aspect 42. The process defined in any one of aspects 3-37, wherein the reactor system comprises two or more reactors.

Aspect 43. The process defined in any one of aspects 3-37 and 40-42, wherein the reactor system comprises a solution reactor, gas-phase reactor, slurry reactor, or a combination thereof.

Aspect 44. The process defined in any one of aspects 3-37 and 40-43, wherein the reactor system comprises a loop slurry reactor.

Aspect 45. The process defined in any one of aspects 3-37 and 40-44, wherein the polymerization conditions comprise a polymerization reaction temperature in a range from about 60° C. to about 185° C., from about 60° C. to about 115° C., or from about 130° C. to about 180° C., and any suitable reaction pressure, e.g., from about 200 to about 1000 psig.

Aspect 46. The process defined in any one of aspects 3-37 and 40-45, wherein the catalyst system comprises a co-catalyst.

Aspect 47. The process defined in any one of aspects 3-37 and 40-46, wherein the olefin comonomer comprises 1-butene, 1-hexene, 1-octene, or a mixture thereof.

Aspect 48. The process defined in any one of aspects 3-37 and 40-47, wherein the ethylene polymer comprises an ethylene homopolymer, an ethylene/1-butene copolymer, an ethylene/1-hexene copolymer, and/or an ethylene/1-octene copolymer.

We claim:

1. A polymer composition comprising:
   a titanated chromium-based ethylene polymer comprising an ethylene homopolymer and/or an ethylene/$\alpha$-olefin copolymer;
   (ii) from about 150 ppm to about 350 ppm of zinc stearate and/or calcium stearate;
   (iii) from about 50 ppm to about 5000 ppm of a phenolic antioxidant; and
   (iv) from about 200 ppm to about 3000 ppm of a diphosphite antioxidant; and
   wherein the polymer composition has a $\Delta$color/$\Delta$time of less than 45.

2. An article of manufacture comprising the polymer composition of claim 1.

3. The composition of claim 1, wherein the polymer composition contains:
   from about 150 ppm to about 300 ppm of zinc stearate and/or calcium stearate;
   from about 200 ppm to about 2500 ppm of the phenolic antioxidant; and
   from about 750 ppm to about 3000 ppm of the diphosphite antioxidant; and
   wherein the $\Delta$color/$\Delta$time is less than 40.

4. The composition of claim 3, wherein:
   the polymer composition is in the form of pellets; and
   the polymer composition further comprises at least one other additive selected from an antiblock additive, a slip additive, a colorant, a filler, a UV additive, or any combination thereof.

5. The composition of claim 3, wherein:
   the $\Delta$color/$\Delta$time is less than 35; and
   the polymer composition has a PE color number of at least 200 after storage for 4 weeks at a temperature of 80° C.

6. The composition of claim 1, wherein the ethylene polymer comprises the ethylene homopolymer, an ethylene/1-butene copolymer, an ethylene/1-hexene copolymer, and/or an ethylene/1-octene copolymer.

7. The composition of claim 6, wherein the ethylene polymer is characterized by:
   a density in a range from about 0.92 to about 0.96 g/cm$^3$;
   a Mw in a range from about 150,000 to about 750,000 g/mol;
   a ratio of Mw/Mn in a range from about 5 to about 40;
   a melt index (MI) in a range from 0 to about 0.5 g/10 min; and
   a high load melt index (HLMI) in a range from about 0.5 to about 25 g/10 min.

8. The composition of claim 6, wherein the ethylene polymer contains:
   less than 0.2 ppm of zirconium;
   less than 0.2 ppm of hafnium; and
   less than 5 ppm of magnesium.

9. The composition of claim 6, wherein the ethylene polymer contains:
   from about 0.5 to about 15 ppm of chromium; and
   from about 0.5 to about 15 ppm of titanium.

10. The composition of claim 6, wherein:
    the polymer composition comprises calcium stearate; and
    the Δcolor/Δtime is less than 40.

11. The composition of claim 6, wherein:
    the polymer composition comprises zinc stearate; and
    the Δcolor/Δtime is less than 40.

12. A polymer composition comprising:
    (i) a titanated chromium-based ethylene polymer comprising an ethylene homopolymer and/or an ethylene/α-olefin copolymer;
    (ii) from about 150 ppm to about 350 ppm of zinc stearate and/or calcium stearate;
    (iii) from about 50 ppm to about 5000 ppm of a phenolic antioxidant;
    (iv) from about 200 ppm to about 3000 ppm of a monophosphite antioxidant; and
    (v) from about 200 ppm to about 3000 ppm of a diphosphite antioxidant; and
    wherein the polymer composition has a Δcolor/Δtime of less than 45.

13. An article of manufacture comprising the polymer composition of claim 12.

14. The composition of claim 12, wherein the polymer composition contains:
    from about 150 ppm to about 300 ppm of zinc stearate and/or calcium stearate;
    from about 200 ppm to about 2500 ppm of the phenolic antioxidant;
    from about 500 ppm to about 2000 ppm of the monophosphite antioxidant; and
    from about 750 ppm to about 3000 ppm of the diphosphite antioxidant; and
    wherein the Δcolor/Δtime is less than 40.

15. The composition of claim 14, wherein:
    the polymer composition is in the form of pellets; and
    the polymer composition further comprises at least one other additive selected from an antiblock additive, a slip additive, a colorant, a filler, a UV additive, or any combination thereof.

16. The composition of claim 14, wherein:
    the Δcolor/Δtime is less than 35; and
    the polymer composition has a PE color number of at least 200 after storage for 4 weeks at a temperature of 80° C.

17. The composition of claim 12, wherein the ethylene polymer comprises the ethylene homopolymer, an ethylene/1-butene copolymer, an ethylene/1-hexene copolymer, and/or an ethylene/1-octene copolymer.

18. The composition of claim 17, wherein the ethylene polymer is characterized by:
    a density in a range from about 0.92 to about 0.96 g/cm$^3$;
    a Mw in a range from about 150,000 to about 750,000 g/mol;
    a ratio of Mw/Mn in a range from about 5 to about 40;
    a melt index (MI) in a range from 0 to about 0.5 g/10 min; and
    a high load melt index (HLMI) in a range from about 0.5 to about 25 g/10 min.

19. The composition of claim 17, wherein the ethylene polymer contains:
    less than 0.2 ppm of zirconium;
    less than 0.2 ppm of hafnium; and
    less than 5 ppm of magnesium.

20. The composition of claim 17, wherein the ethylene polymer contains:
    from about 0.5 to about 15 ppm of chromium; and
    from about 0.5 to about 15 ppm of titanium.

21. The composition of claim 17, wherein:
    the polymer composition comprises calcium stearate; and
    the Δcolor/Δtime is less than 40.

22. The composition of claim 17, wherein:
    the polymer composition comprises zinc stearate; and
    the Δcolor/Δtime is less than 40.

* * * * *